United States Patent [19]

Lefler, III

[11] 4,011,191

[45] Mar. 8, 1977

[54] HEAT-CURABLE SILICONE ELASTOMER COMPOSITIONS CONTAINING ALKENYLTRIACETOXYSILANES

[75] Inventor: Harold V. Lefler, III, Sanford, Mich.

[73] Assignee: Dow Corning Corporation, Midland, Mich.

[22] Filed: Jan. 15, 1976

[21] Appl. No.: 649,290

[52] U.S. Cl. .................. 260/37 SB; 260/46.5 UA
[51] Int. Cl.² ............................................ C08L 83/04
[58] Field of Search ............... 260/37 SB, 46.5 UA

[56] References Cited

UNITED STATES PATENTS

| | | | |
|---|---|---|---|
| 2,723,966 | 11/1955 | Youngs | 260/46.5 |
| 3,264,258 | 8/1966 | Ceyzeriat | 260/46.5 |
| 3,341,489 | 9/1967 | Simpson | 260/37 |
| 3,769,253 | 10/1973 | Stevenson | 260/33.6 |

*Primary Examiner*—Lewis T. Jacobs
*Attorney, Agent, or Firm*—Roger H. Borrousch

[57] ABSTRACT

Heat-curable silicone elastomer compositions are disclosed which comprise a low-viscosity polydiorganosiloxane, free of silicon-bonded hydroxy radicals and silicon-bonded hydrolyzable radicals, an organic peroxide, a filler and an alkenyltriacetoxysilane. A process for curing the resulting compositions to provide elastomeric materials having a dry, non-tacky surface is also disclosed. The compositions of this invention also have improved adhesion to certain substrates when heat-cured in contact with the substrate.

10 Claims, No Drawings

HEAT-CURABLE SILICONE ELASTOMER COMPOSITIONS CONTAINING ALKENYLTRIACETOXYSILANES

BACKGROUND OF THE INVENTION

1. Field of the Invention

This invention relates to polydiorganosiloxane compositions which are stable in the absence of moisture but which are curable with heat and moisture to yield elastomeric materials having a dry, non-tacky surface. This invention further relates to a method of producing said elastomeric materials.

2. Description of the Prior Art

In the early days of commercial silicone rubber one of the problems that afflicted the peroxide-curable organopolysiloxane compositions was the tacky surface that was obtained when the compositions were cured in the presence of oxygen. A solution to this problem, albeit a tedious solution, was to cure the compositions in the absence of oxygen. A better solution was to use a dichlorobenzoly peroxide to cure the composition as taught by Youngs in U.S. Pat. No. 2,732,966.

This problem of surface tack still exists with the peroxide-cured organopolysiloxane compositions of today that are based on low-viscosity polydiorganosiloxanes. The use of a dichlorobenzoyl peroxide does not eliminate the surface tack of peroxide-currred low-viscosity polydiorganosiloxanes.

Acetoxysilanes have been mixed with certain organosilicon compositions for various reasons for a long time. It was therefore surprising to find that the surface tack of a heat-cured composition comprising a low-viscosity polydiorganosiloxane can be eliminated simply by mixing, with the uncured composition, an alkenyltriacetoxysilane.

It is known to mix an organic peroxide with room-temperature-curable silicone compositions which comprise acyloxysilanes. For example, Ceyzeriat, in U.S. Pat. No.3,264,258 discloses a vulcanizable, moisture-free liquid composition comprising a linear, hydroxy-terminated diorganopolysiloxane that is crosslinked both by an organic peroxide and by an organotriacyloxysilane. The compositions of Ceyzeriat cure to elastomeric materials when exposed to moisture, in the well-known fashion, and may be optionally further cured by heating to confer additional thermal stability to the moisture-cured composition.

Silanes have also been mixed with heat-curable compositions that are based on high-viscosity polydiorganosiloxanes. Simpson. in U.S. Pat. No. 3,341,489 discloses a heat-curable composition comprising 100 parts of an organopolysiloxane polymer having a viscosity of at least 100,000 centipoise at 25° C., 10 to 300 parts of a filler, and 0.1 to 10 parts of an olefinically unsaturated organosilicon material. The compositions of Simpson can further comprise from 0.1 to 8 parts of an organic peroxide. The olefinically unsaturated organosilicon material in Simpson's compositions can be any of a number of materials including acetoxysilanes, but alkenyltriacetoxysilanes are neither taught specifically nor preferred. Przybyla, in U.S. application Ser. No. 600,692, of July 31, 1975, entitled "Heat-curable Silicone Elastomers Having Unprimed Adhesion" and assigned to the assignee of this application, discloses the mixing of a room-temperature-curable silicone elastomer stock having silicon-bonded acetoxy radicals with an organic-peroxide-curable organopolysiloxane to obtain a heat-curable elastomeric composition having unprimed adhesion. The room-temperature-curable silicon elastomer stock can be preformed and admixed with the organic-peroxide-curable organopolysiloxane or the components of said elastomeric stock comprising a hydroxy-endblocked polyorganosiloxane fluid and an acetoxysilane can be added to said organopolysiloxane. Stevenson, in U.S. Pat. No. 3,769,253 discloses a primer composition for heat-curable silicone rubber comprising a silicone polymer solution, an organic-peroxide curing catalyst and a silane of the formula $R^1_x Si(OOCR^2)_{4-x}$ in which $R^1$ is an alkenyl radical having from 1 to 10 carbon atoms, $R^2$ is an alkyl group having from 1 to 5 carbon atoms and $x$ is an integer of from 1 to 2. Exemplary of the suitable compound is vinyltriacetoxysilane. The primer solutions of Stevenson are applied to a substrate and thereafter dried, preferably prior to the application of the silicone rubber that is to be bonded to the primed substrate. The assembly of substrate, primer composition and convertible silicone rubber is then heated under pressure to cure and bond the silicone rubber to the primed substrate.

The disclosures of Simpson and Przybyla and Stevenson are directed to compositions based on high-viscosity polyorganosiloxanes. Since the teachings of Youngs, supra, offer a solution to the problem of surface tack in peroxide-curable compositions based on high-viscosity polyorganosiloxanes but fail when applied to similar low-viscosity polydiorganosiloxanes, the teachings of Simpson and/or Przybyla and/or Stevenson would not be expected to offer a solution of the problem of surface tack in peroxide-cured low-viscosity polydiorganosiloxane compositions.

SUMMARY OF THE INVENTION

It is an object of the invention to provide new, heat-curable polyorganosiloxane compositions.

It is another object of this invention to provide heat-curable polyorganosiloxane composition that have a dry, non-tacky surface in the cured state.

Still another object of this invention is to provide a method for preparing a heat-cured silicone elastomer having a dry, non-tacky surface.

These and other objects are provided by the compositions of this invention consisting essentially of a low-viscosity, vinyl-endblocked polydiorganosiloxane fluid, an organic peroxide, a filler and an alkenyltriacetoxysilane and by the process of this invention comprising preparing the compositions of this invention and then heating and exposing to moisture said compositions.

DESCRIPTION OF THE INVENTION

This invention relates to an anhydrous composition, heat-curable in the presence of moisture to form an elastomeric material having a dry, non-tacky surface, said composition consisting essentially of (A) 100 parts by weight of a vinyl-endblocked polydiorganosiloxane having a viscosity of from 1 pascal-second to less than 100 pascal-seconds at 25° C., wherein the organic radicals are selected from the group consisting of monovalent hydrocarbon radicals and fluorinated monovalent hydrocarbon radicals, at least 50 percent of all organic radicals being methyl, (B) from 3 to 10 parts by weight of an alkenyltriacetoxysilane, (C) from 0.1 to 10 parts by weight of an organic peroxide and (D) from 10 to 300 parts by weight of a filler.

The compositions of this invention are stable at room temperature in the absence of moisture, but said compositions are not cured when exposed to moisture. The action of moisture alone on said compositions serves to gradually reduce the ability of the compositions of this invention to provide a dry, non-tacky surface when cured. The compositions of this invention are cured by decomposing the organic peroxide, preferably by heating the composition, and exposing the composition to moisture to provide an elastomeric material having a dry, non-tacky surface.

This invention further relates to a process comprising the steps of (i) preparing an anhydrous mixture consisting essentially of (A) 100 parts by weight of a vinyl-endblocked polydiorganosiloxane having a viscosity of from 1 pascal-second to less than 100 pascal-seconds at 25° C., wherein the organic radicals are selected from the group consisting of monovalent hydrocarbon radicals and fluorinated monovalent hydrocarbon radicals, at least 50 percent of all organic radicals being methyl, (B) from 3 to 10 parts by weight of an alkenyltriacetoxysilane, (C) from 0.1 to 10 parts by weight of an organic peroxide and (D) from 10 to 300 parts by weight of a filler, (ii) heating and exposing to moisture the anhydrous mixture of (i), and (ii) obtaining an elastomeric material having a dry, non-tacky surface.

Component(A) is an essentially linear polydiorganosiloxane of the general formula $CH_2=CH(R)_2SiO-(R_2SiO)_nSi(R)_2CH=CH_2$. By essentially linear it is meant that (A) consists essentially of reoccuring $R_2SiO$ siloxane units and is soluble in one or more common organic solvents; but it is to be understood that there may be within the polymer (A) a small percentage, based on the total number of siloxane units, of $R_3SiO_{1/2}$ siloxane units, $RSiO_{3/2}$ siloxane units and $SiO_{4/2}$ siloxane units. The average value of $n$ is such that the viscosity of (A) has a value of from 1,000 centipoise (1 pascal-second) to less than 100,00 centipoise (100 pascal-seconds) at 25° C. Preferably the viscosity of (A) is greater than 5 pascal-seconds (Pa·s) since compositions comprising a polydiorganosiloxane having a viscosity of greater than 5 Pa·s provide better strength in the cured state than compositions comprising lower-viscosity polydiorganosiloxanes.

Polydiorganosiloxane (A) bears silicon-bonded organic radicals, R, which are selected from the group consisting of monovalent hydrocarbon radicals and fluorinated monovalent hydrocarbon radicals. At least 50 percent of all R radicals are methyl. Any remaining R can be monovalent hydrocarbon radical such as alkyl radicals such as methyl, ethyl, propyl, isopropyl, butyl, pentyl, isopentyl, neopentyl, hexyl, octyl, dodecyl, 3-methylheptyl, tertiary butyl, and 2,2-diethylpentyl; alkenyl radicals such as vinyl, allyl, hexenyl, butenyl; alkynyl radicals such as propynyl; cycloaliphatic radicals such as, cyclobutyl, cyclopentyl, cyclohexyl, cycloheptyl, propylcyclohexyl, cyclohexenyl; aryl radicals such as phenyl, tolyl, xylyl, 3-ethylphenyl, xenyl; and aralkyl radicals such as benzyl, 2-phenylethyl and 2-phenylpropyl; any fluorinated monovalent hydrocarbon radical such as $R_fCH_2CH_2-$ where $R_f$ is a perfluoroalkyl radical such as $CF_3$, $CF_3CF_2$, $(CF_3)_2CF-$; or fluorinated aryl radicals such as $\alpha, \alpha, \alpha$-trifluorotolyl, hexafluoroxylyl and perfluorophenyl.

Preferably R is selected from the group consisting of monovalent hydrocarbon radicals of 1 to 6 carbon atoms, such a methyl, ethyl, isopropyl, phenyl and vinyl radicals and 3,3,3-trifluoropropyl radicals. Furthermore, it is preferred that no more than 2 percent of all R radicals in (A) have aliphatic unsaturation. Polydiorganosiloxane (A) preferably comprises diorganosiloxane units such as $(CH_3)_2SiO$, $CH_3(C_6H_5)SiO$, $(C_6H_5)_2SiO$, $CH_3(CF_3CH_2CH_2)SiO$, $CH_3(CH_2=CH)SiO$, $CH_3CH_2(CH_2=CH)SiO$ and the like. A highly preferred polydiorganosiloxane is polydimethylsiloxane.

Polydiorganosiloxane (A) is endblocked with vinyldiorganosiloxane units of the formula $CH_2=CH(R)_2SiO_{1/2}$ such as $CH_2=CH(CH_3)_2SiO_{1/2}$, $CH_2=CH(CH_3)(C_6H_5)SiO_{1/2}$ and $CH_2=CH(CH_3)(CF_3CH_2CH_2)SiO_{1/2}$.

Polydiorganosiloxane (A) is essentially free of silicone-bonded hydroxyl radicals and silicone-bonded hydrolyzable radicals that are convertible, through a reaction with water at room temperature to silicon-bonded hydroxyl radicals.

Any method that is suitable for the preparation of vinyl-endblocked polydiorganosiloxanes can be used to prepare component (A) of the compositions of this invention. For example, component (A) can be prepared by polymerizing the appropriate polydiorganocyclosiloxane, such as octamethylcyclotetrasiloxane in the presence of an appropriate endblocking reactant, such as sym-divinyltetramethyldisiloxane, using an alkaline or acid catalyst. The value of $n$, the degree of polymerization, in the general formula for component (A) is determined by the ratio of the polydiorganocyclosiloxane and the endblocking reactant that is used in the polymerization process. Component (A) can also be prepared by cohydrolyzing and condensing the appropriate chlorosilanes and/or alkoxysilanes in the presence of an alkaline or acid catalyst. Vinyl-endblocked polydiorganosiloxanes are well known in the organosilicon art; many are prepared commerically.

Component (B) is an alkenyltriacetoxysilane, preferably vinyltriacetoxysilane. It has been found that alkyltriacetoxysilanes, such as methyltriacetoxysilane or ethyltriacetoxysilane, do not provide a dry, non-tacky surface when used as component (B) in the compositions of this invention. Component (B) can be any alkenyltriacetoxysilane or mixture of alkenyltriacetoxysilanes of the formula $ZSi(O_2CCH_3)_3$ where Z is a monovalent hydrocarbon radical bearing olefinic unsaturation such as vinyl, allyl, cyclohexenyl, and butenyl.

Alkenyltriacetoxysilanes are well known in the organosilicon art and can be prepared by any suitable method for the preparation of acetoxysilanes. For example, the appropriate alkyenyltrichlorosilane, such as vinyltrichlorosilane, is allowed to react with an appropriate acetoxy source, such as sodium acetate or acetic anhydride. Since acetoxysilanes are very reactive with water, vapor or liquid, the usual precautions should be taken to maintain an essentially anhydrous atmosphere while preparing and handling alkenyltriacetoxysilanes.

While component (B) is described as an alkenyltriacetoxysilane of the formula $ZSi(O_2CCH_3)_3$, it is to be understood that there can be present in (B) minor amounts of condensed that there can be present in (B) minor amounts of condensed alkenyltriacetoxysilanes that result when an alkenyltriacetoxysilane reacts with a less-than-stoichiometric amount of water. Thus, while it is desirable to prepare and handle alkenyltriacetoxysilanes under essentially anhydrous conditions, achieving this precaution is not always practical. For instance, other components of the compositions of this invention, such as the filler, may contain small amounts of adventitious water which will react with the alkenyltriacetoxysilane to produce acetic acid and an alkenyldiacetoxyhydroxysilane which rapidly reacts with more alkenyltriacetoxysilane to produce more acetic acid and the simplest condensed alkenyltriacetoxysilane, i.e., $Z(CH_3CO_2)_2SiOSi(CH_3CO_2)_2Z$. Further reaction of this simplest condensed alkenyltriacetoxysilane with either water and alkenyltriacetoxysilane or water and condensed alkenyltriacetoxysilane or alkenylhydroxysilane leads to higher-molecular-weight condensed alkenyltriacetoxysilanes. Minor amounts of these condensed alkenyltriacetoxysilanes in alkenyltraicetoxysilane (B) are operative in the compositions of this invention.

For every 100 parts by weight of vinyl-endblocked polydiorganosiloxane (A) there is present, in the compositions of this invention, from 3 to 10 parts by weight of the alkenyltriacetoxysilane (B). Smaller amounts of alkenyltriacetoxysilane do not produce cured compositions having a dry, non-tacky surface. Larger amounts of alkenyltriacetoxysilane result in undesirably large amounts of the by-produced acetic acid that is liberated when the compositions of this invention are exposed to moisture.

The compositions of this invention comprise an organic peroxide which serves to cure said composition when the peroxide is decomposed. Organic peroxide (C) can be any of the well-known peroxides that are used to cure polyorganosiloxanes. Typical organic peroxides that may be used in the compositions of this invention include 2,4-dichlorobenzoyl peroxide, benzoyl peroxide, dicumyl peroxide, 2,5-di(tertiary butyl peroxy)-2,5-dimethylhexane, t-butylperbenzoate, di(-tertiary butyl)peroxide and tertiary butyl peroxy isopropyl carbonate. It is preferred to use 2,4-dichlorobenzoyl peroxide as component (C) in the compositions of this invention since said compositions, when cured at atmospheric pressure, display essentially no bubbling, a phenomenon otherwise known as blowing.

For every 100 parts by weight of component (A) there is present, in the compositions of this invention, from 0.1 to 10 parts by weight of the organic peroxide (C). It is preferred to use from 1 to 3 parts by weight of the organic peroxide to obtain cured elastomeric compositions which have general utility. Loadings of organic peroxide higher than 3 parts by weight lead to tighter cured compositions while loading of organic peroxide lower than 1 part by weight lead to softer cured compositions.

The compositions of this invention further comprise a filler which may be any of the well-known reinforcing fillers or extending fillers that are used in the organosilicon rubber art.

Filler (D) can be a reinforcing filler such as fume silica, precipitated silica, silica aerogel and the like. These silica fillers can be used in the anhydrous form or in a form which contains varying amounts of adsorbed moisture, depending upon the method of preparation of the silica. Silica fillers, suitable as (D), can be treated, untreated or treated in situ in the known fashions. Treating agents for the silica fillers include silazanes such as hexamethyldisilazane, chlorosilanes such as trimethylchlorosilane, siloxanes such as hexamethylcyclotrisiloxane, and low-molecular-weight silanols such as hydroxy-endblocked polydiorganosiloxanes having a viscosity of less than 0.5 pascal-seconds.

Filler (D) can also be any of the extending fillers that are common to the slicone rubber art. Typical extending fillers which are suitable include ground quartz, diatomaceous earths, calcium carbonate, asbestos, alumina, titania, and carbon black.

Filler (D) can consist of one or more fillers described above. For example, the composition of this invention can consist of a reinforcing silica filler having a large surface area to confer greater tensile strength and/or tear strength to the cured composition. Alternately, where strength in the cured composition is of secondary consideration, filler (D) can consist of an extending filler such as ground quartz to confer other attributes, such as lower cost or better flowability to the uncured compositions. Of course, filler (D) can also consist of any mixture of one or more reinforcing fillers and one or more extending fillers as is often the practice in the organosilicon rubber art.

The compositions of this invention comprise from 10 to 300 parts by weight of a filler for every 100 parts by weight of polydiroganosiloxane (A). Preferably, the compositions of this invention should comprise no more than 100 parts by weight of a reinforcing silica.

The compositions of this invention can further comprise any of the well-known additives that are used in organosilicon rubber as long as said additives do not interfere with the preparation of a dry, non-tacky cured composition. Well-known additives include pigments, thioxtroping agents, heat stability additives, fire-retardant additives, etc.

The compositions of this invention are produced by mixing the appropriate amounts of polydiorganosiloxane (A), alkenyltriacetoxysilane (B), organic peroxide (C) and filler (D) in any order using mixing means that are common to the organosilicon rubber art, such as a dough mixer, a three-roll mill and a Semco mixer. It is preferred to maintain an essentially anhydrous atmosphere in the mixer means during and after the mixing of the alkenyltriacetoxysilane. Since the alkenyltriacetoxysilane will react with water, the compositions of this invention are anhydrous and should be protected from moisture until they are to be used. By anhydrous it is meant that the compositions of this invention are essentially free of water vapor and liquid water. It is to be understood, however, that there may be in said compositions trace amounts of water which are not readily removed or scavenged, such as water of hydration or interstitial water that might be associated with a solid component, such as silica.

The best way to produce the compositions of this invention is to admix filler (D), any non-volatile, heat-stable additives and the vinyl-endblocked polydiorganosiloxane (A) in a dough mixer or a three-roll mill, using heat to aid the mixing process and then admix the organic peroxide (C) and other additives with the cooled mixture comprising (A) and (D). Alkenyltriacetoxysilane is the mixed with the resulting mixture of polydiorganosiloxane, filler and organic peroxide and the resulting anhydrous mixture is stored under anhydrous conditions until used. If the compositions of this invention are not stored under essentially anhydours conditions, silicon-bonded acetoxy radicals in the composition are hydrolyzed and the composition gradually loses its ability to provide an elastomeric material having a dry, non-tacky surface when heated in the presence of moisture.

The compositions of this invention are cured to an elastomeric material having a dry, non-tacky surface by heating said composition to a sufficiently high temperature and for a sufficient period of time to decompose the organic peroxide and exposing the composition to moisture. It is to be understood that the composition of this invention can be exposed to moisture without curing before the heating process is accomplished but that a gradual loss of efficacy of the composition, as noted above, occurs if this is done. Preferably the compositions of this invention are promptly heated after being exposed to moisture. Herein, the term promptly means within a span of time not to exceed about 8 hours. The compositions of this invention can also be heated and exposed to moisture simultaneously to accomplish curing. Alternatively, the compositions of this invention can be cured by heating and then promptly exposing the heated composition to moisture. The temperature and time of heating is dependent upon the type and amount of peroxide that is used in the compositions of this invention, as is well-known in the art.

The compositions of this invention have a relatively low viscosity compared to the usual peroxide-cured polyorganosiloxane composition and are thus useful where the composition is to be extruded or spread or flowed into place and then cured to form elastomeric seals, coatings and molded articles.

The compositions of this invention are especially useful since they can be positioned under ambient conditions for up to 8 hours without undergoing a skinning-over or a curing reaction and yet, when heated, said compositions will cure to an elastomeric material that possesses the dry, non-tacky surface and the adhesion to certain substrates that is characteristic of room-temperature-curable polyorganosiloxane compositions having silicon-bonded acetoxy radicals.

Since the cured compositions of this invention have improved adhesion to many substrates they are particularly useful for preparing elastomeric seals and gaskets that are firmly bonded to the substrate.

The following examples further illustrate this invention and should not be construed as limiting the invention which is properly delineated in the claims.

EXAMPLE 1

One hundred parts of a vinyl-endblocked polydimethylsiloxane having a viscosity of approximately 55,000 centipoise (55 Pa·s) at 25° C. was mixed with 3 parts of fume silica, 0.85 parts of a hydroxyl-endblocked polyphenylmethylsiloxane having a viscosity of about 0.5 Pa·s, 69 parts of 5 micron ground quartz, 3 parts of $Fe_2O_3$ and 6 parts of an equal weight mixture of 2,4-dichlorobenzoyl peroxide and a low viscosity trimethylsiloxy-enblocked polydimethylsiloxane fluid. Several portions of the resulting heat-curable composition were mixed with vinyltriacetoxysilane in the absence of water at levels of 0.52, 1.04, 2,18, and 4.15 parts by weight for every 100 parts by weight of vinyl-enblocked polydimethylsiloxane. The resulting anhydrous compositions were exposed to a 50 percent relative humidity atmosphere and heated at 150° C. for 10 minutes. Only the anhydrous composition containing 4.15 parts by weight vinyltriacetoxysilane gave a cured material having a dry surface. The sample containing 2.18 parts by weight of vinyltriacetoxysilane cured to an elastomer having a slightly tacky surface.

EXAMPLE 2

A heat-curable composition, similar to the heat-curable composition of Example 1 except 33 parts of the 5 micron ground quartz was replaced with 33 parts of $CaCO_3$. This composition was mixed with 4.15 parts by weight of vinyltriacetoxysilane, beased on 100 parts by weight of the vinyl-endblocked polydimethylsiloxane. The resulting anhydrous composition was cured at 150° F. for 10 minutes in an air-circulating oven to give an elastomeric material having a dry, non-tacky surface. The air circulating through the oven had a 50 percent relative humidity at room temperature.

EXAMPLE 3

The heat-curable composition of Example 1 having non vinyltriacetoxysilane was cured on copper, brass, aluminum, anodized aluminum, glass and steel surfaces for 5, 10, and 15 minute periods at 150° C. Adhesion was uniformly poor to all the substrates and at all the cure conditions. The heat-curable composition of Example 1 was mixed with 3 weight percent vinyltriacetoxysilane, based on the weight of the composition (5.45 parts vinyltriacetoxysilane per 100 parts of vinyl-endblocked polydimethylsiloxane) and the resulting anhydrous composition was cured as above on the above-named substrates. Adhesion of this composition to copper and brass was still poor, but excellent adhesion to aluminum, anodized aluminum, glass and steel was obtained.

That which is claimed is:

1. An anhydrous composition, heat-curable in the presence of moisture to form an elastomeric material having a dry, non-tacky surface, said composition consisting essentially of
   A. 100 parts by weight of a vinyl-enblocked polydiorganosiloxane having a viscosity of from 1 pascal-second to less than 100 pascal-seconds at 25° C. wherein the organic radicals are selected from the group consisting of monovalent hydrocarbon radicals and fluorinated monovalent hydrocarbon radicals, at least 50 percent of all organic radicals being methyl,
   B. from 3 to 10 parts by weight of an alkenyltriacetoxysilane,
   C. from 0.1 to 10 parts of an organic peroxide and
   D. from 10 to 300 parts by weight of a filler.

2. The composition of claim 1 wherein at least 98 percent of all organic radicals in (A) are methyl, no more than 2 percent of all organic radicals in (A) have aliphatic unsaturation, any remaining organic radicals in (A) being selected from the group consisting of monovalent hydrocarbon radicals of 2 to 6 carbon atoms inclusive and 3,3,3-trifluoropropyl and viscosity of (A) has a value of greater than 5 pascal-seconds at 25° C.

3. The composition of claim 2 wherein the organic peroxide is present in from 1 to 3 parts by weight.

4. The composition of claim 3 wherein the polydiorganosiloxane is a vinyldiorganosiloxy-endblocked polydimethylsiloxane, the alkenyltriacetoxysilane is vinyltriacetoxysilane and the organic peroxide is 2,4-dichlorobenzoyl peroxide.

5. A process comprising
   i. preparing an anhydrous mixture consisting essentially of
      A. 100 parts by weight of a vinyl-endblocked polydiorganosiloxane having a viscosity of from 1 pascal-second to less than 100 pascal-seconds at 25° C. wherein the organic radicals are selected from the group consisting of monovalant hydrocarbon radicals and fluoroinated monovalent hydrocarbon radicals, at least 50 percent of all organic radicals being methyl, B. from 3 to 10 parts by weight of an alkenyltriacetoxysilane, C. from 0.1 to 10 parts by weight of an organic peroxide, and D. from 10 to 300 parts by weight of a filler, ii. heating and exposing to moisture the anhydrous mixture of (i), and iii. obtaining an elastomeric material having a dry, non-tacky surface.

6. The process of claim 5 wherein the anhydrous mixture of (i) consists essentially of a vinyl-endblocked polydimethylsiloxane, vinyltriacetoxysilane, 2,4-dichlorobenzoyl peroxide and a filler.

7. The process of claim 6 wherein the anhydrous mixture is heated promptly after being exposed to moisture.

8. The process of claim 6 wherein the anhydrous mixture is exposed to moisture promptly after being heated.

9. The process of claim 6 wherein the anhydrous mixture is heated and simultaneously exposed to moisture.

10. The elastomeric material obtained by the process of claim 5.

* * * * *

UNITED STATES PATENT AND TRADEMARK OFFICE
CERTIFICATE OF CORRECTION

PATENT NO. : 4,011,191
DATED : March 8, 1977
INVENTOR(S) : Harold V. Lefler, III It is certified that error appears in the above-identified patent and that said Letters Patent are hereby corrected as shown below:

In Column 2, line 41; the word "composition" should read "compositions".

In Column 3, line 25; the word "(ii)" should read "(iii)".

In Column 3, line 28; the symbol "—" between the "O" and the "(" should be deleted.

In Column 3, line 38; the number "100,00" should read "100,000".

In Column 4, line 6; the formula "$CH_3(CH_3CH_2)SiO,$" should be inserted before the formula "$CH_3(CH_2=CH)SiO,$".

In Column 4, line 15; the word "cone-bonded" should read "con-bonded".

In Column 4, line 15; the word "silicone-bonded" should read "silicon-bonded".

In Column 4, lines 62-63; delete the phrase "that there can be present in (B) minor amounts of condensed".

UNITED STATES PATENT AND TRADEMARK OFFICE
CERTIFICATE OF CORRECTION

PATENT NO. : 4,011,191
DATED : March 8, 1977
INVENTOR(S) : Harold V. Lefler, III It is certified that error appears in the above-identified patent and that said Letters Patent are hereby corrected as shown below:

In Column 8, line 42; the term "by weight" should be inserted between "parts" and "of".

Signed and Sealed this

Thirteenth Day of October 1981

[SEAL]

Attest:

GERALD J. MOSSINGHOFF

*Attesting Officer*    *Commissioner of Patents and Trademarks*